United States Patent
Campbell et al.

(10) Patent No.: US 6,785,975 B1
(45) Date of Patent: Sep. 7, 2004

(54) ACCELEROMETER AUGMENTED PRECISION COMPASS

(75) Inventors: Ray F. Campbell, Newport Beach, CA (US); Joan D. Wada, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/604,625

(22) Filed: Aug. 5, 2003

(51) Int. Cl.[7] ............................................. G01C 19/38
(52) U.S. Cl. ........................................ 33/356; 33/300
(58) Field of Search .......................... 33/316, 318, 320, 33/324, 329, 330, 355 R, 356; 73/504.01, 504.02, 504.08, 504.12, 503.3

(56) References Cited

U.S. PATENT DOCUMENTS

| | | | | |
|---|---|---|---|---|
| 4,601,206 A | * | 7/1986 | Watson | 73/514.02 |
| 4,792,676 A | * | 12/1988 | Hojo et al. | 73/504.18 |
| 6,293,148 B1 | * | 9/2001 | Wang et al. | 73/504.12 |
| 6,338,199 B1 | * | 1/2002 | Chigira et al. | 33/318 |
| 6,622,647 B2 | * | 9/2003 | DePoy | 114/21.3 |
| 2002/0005297 A1 | * | 1/2002 | Alft et al. | 175/26 |

* cited by examiner

Primary Examiner—G. Bradley Bennett
(74) Attorney, Agent, or Firm—Artz & Artz, PC

(57) ABSTRACT

A compass system includes a platform defining an x-axis, a y-axis and an xy-plane, wherein a z-axis is orthogonal to the xz-plane. A beam is rotatably coupled to the platform such that the beam rotates about the y-axis. An accelerometer including a flexure plate perpendicular to the y-axis is coupled to the beam a distance from the y-axis. The accelerometer generates an accelerometer signal in response to movement of the flexure plate. An angular position sensor senses angular position of the beam relative to the x-axis and y-axis, the angular position sensor generating an angular position signal therefrom. A processor receives the accelerometer signal and the angular position signal and generates an East-West signal therefrom.

20 Claims, 5 Drawing Sheets

ACCELEROMETER AUGMENTED PRECISION COMPASS

BACKGROUND OF INVENTION

The present invention relates generally to compass systems, and more particularly, to a flexure plate capacitive compass.

It is well known that aerospace systems, such as missile systems, require internal control systems for the purpose of maintaining a particular level or attitude with respect to a fixed frame, such as the earth.

Currently, mechanical gyro-compass systems are used in aerospace systems to determine earth-spin direction and rotating beam pointing directions. In other words, gyro-compasses find North by using an (electrically powered) fast spinning wheel and friction forces in order to exploit the rotation of the earth. Resultantly, gyro-compasses typically require large amounts of energy to maintain spinning motion.

Minimizing energy requirements is a constant goal for aerospace systems, therefore either eliminating or powering down mechanical gyro-compasses after direction is established would thereby dramatically decrease power consumption.

As was mentioned, compass systems are used in aerospace or in a portion of aircraft or spacecraft navigation or guidance systems. During operation of those system types, the operating environment temperature changes over a wide range. Consequently, object orientations must be measured and controlled with a high accuracy over a wide range of temperatures and temperature gradients. This is often a difficult and inefficient process.

The disadvantages associated with current compass systems have made it apparent that a new compass system is needed. The new compass system should minimize gyro-compass usage, substantially minimize temperature sensing requirements, and should also improve compass accuracy. The present invention is directed to these ends.

SUMMARY OF INVENTION

In accordance with one aspect of the present invention, a compass system includes a platform defining an xy-plane, wherein a z-axis is orthogonal to the xy-plane. A beam is rotatably coupled to the platform such that the beam rotates about the y-axis. An accelerometer including a flexure plate perpendicular to the rotating beam is coupled to the beam a distance from the y-axis. The accelerometer generates an accelerometer signal in response to movement of the flexure plate. An angular position sensor senses angular position of the beam relative to the x-axis in the xy-plane, the angular position sensor generating an angular position signal therefrom. A processor receives the accelerometer signal and the angular position signal and generates an East-West signal therefrom.

In accordance with another aspect of the present invention, a method for operating a compass system on the earth includes leveling a platform with respect to local earth gravity; rotating a flexure plate bridge accelerometer in a plane perpendicular to the platform such that the flexure plate bridge accelerometer reads a sum of a radial acceleration due to the beam rotation, the rotation of the earth, and gravity; generating a sinusoidal signal of a rotating acceleration of the flexure plate bridge accelerometer due to the sum of the velocity of the accelerometer and the rotation of the earth and gravity; reading a positive peak and a negative peak within the sinusoidal signal; and generating an earth rate direction signal in response to the positive peak and the negative peak. As the beam is rotated about the y-axis, the amplitude of the sine wave will vary as to the cosine of the angle formed by the beam and the earth spin vector.

One advantage of the present invention is that it generates a dynamic range and granularity sufficient for Inter-Continental Ballistic Missile (ICBM) usage. Additional advantages include that the compass system consumes less power than prior compass systems, while dramatically improving reliability and reduction in manufacturing costs.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

The present invention is illustrated with respect to a flexure plate capacitive compass, particularly suited to the aerospace field. The present invention is, however, applicable to various other uses that may require compasses, such as any system requiring position compass measurements under extreme conditions, as will be understood by one skilled in the art.

Figure 1:
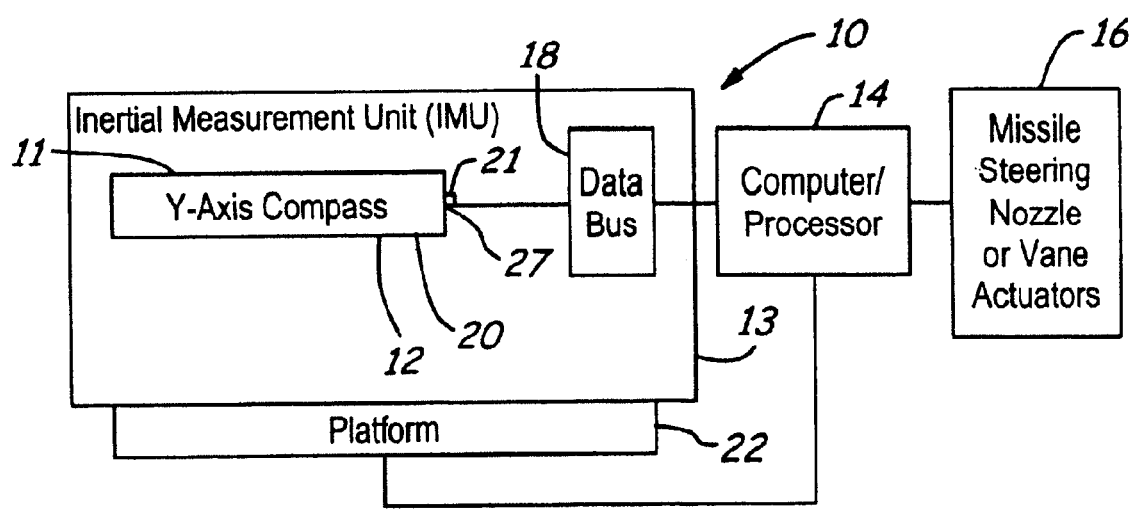
FIG. 1 illustrates an aeronautical system in accordance with one embodiment of the present invention.

Referring to FIG. 1, the missile or aerospace system 10, including a flexure plate capacitive compass system 11 (FPCC) within an inertial measurement unit 13, in accordance with one embodiment of the present invention, is illustrated. The aerospace system 10 is merely an illustrative example of an object requiring compass orientation and not meant to be limiting. For example, the present flexure plate capacitive compass system 11 could be implemented in any object to sense acceleration forces, including any type of vehicle or missile system, such as a Minuteman III missile system or a Scud missile system.

The illustrated aerospace system 10 further includes a computer/processor 14, a missile steering unit 16, a rotating beam angular position sensor 21, and a platform 22.

The computer 14 is coupled to the missile steering (nozzle or vane actuators) unit 16, the rotating beam angular position sensor 21, the compass system 11, and the platform 22.

The compass system 11 includes an accelerometer 12 and a rotating beam 20. The accelerometer 12 is coupled to the rotating beam 20 a distance R from the pivot point 27 of the beam 20, which is coupled to the information bus 18, which transfers information to a computer/processor 14.

Important to note is that the illustrated accelerometer 12 is only one example of a possible arrangement of an accelerometer for the compass system 11, and various types of accelerometer can be utilized. The accelerometer 12 is a single axis accelerometer that generates a robust wide dynamic range of performance. The accelerometer 12 will be discussed in further detail in reference to FIG. 3.

The angular position sensor 21 is embodied as a synchro, a resolver, or a shaft angle reader or any other sensor device measuring angular position of the rotating beam 20.

The rotating beam 20 is embodied as a single flat rotating beam, which may be mounted on a motorized pivot or a freely moving pivot or the platform 22 or any other compass mount known in the art.

The platform 22, whereon the compass 11 and the angular position sensor 21 are mounted, may include gimbals and gimbal torque motors (yaw, pitch and roll motors) or any other accelerometer platform known in the art.

Figure 2A:
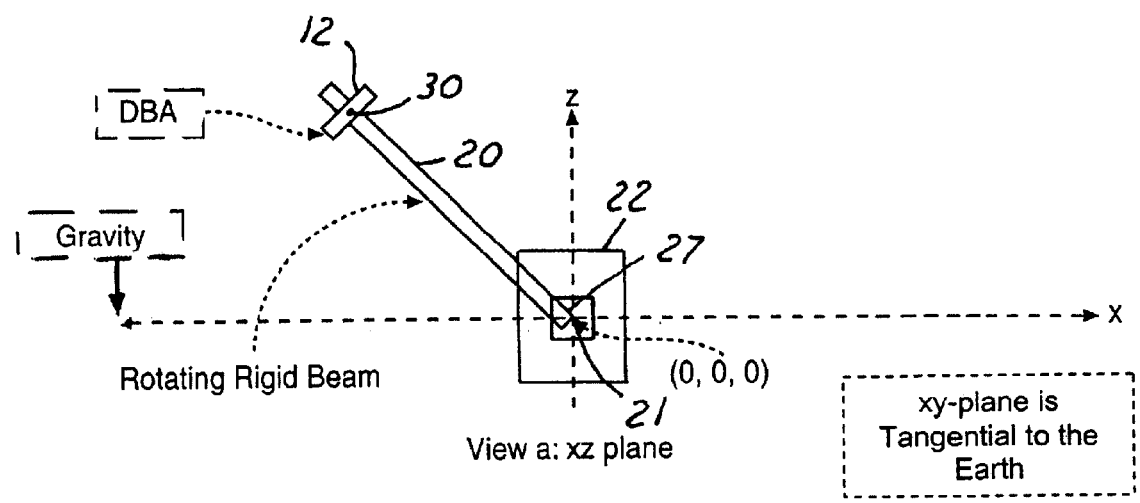
FIG. 2A illustrates an xz-plane view of a compass system in accordance with FIG. 1.
Figure 2B:
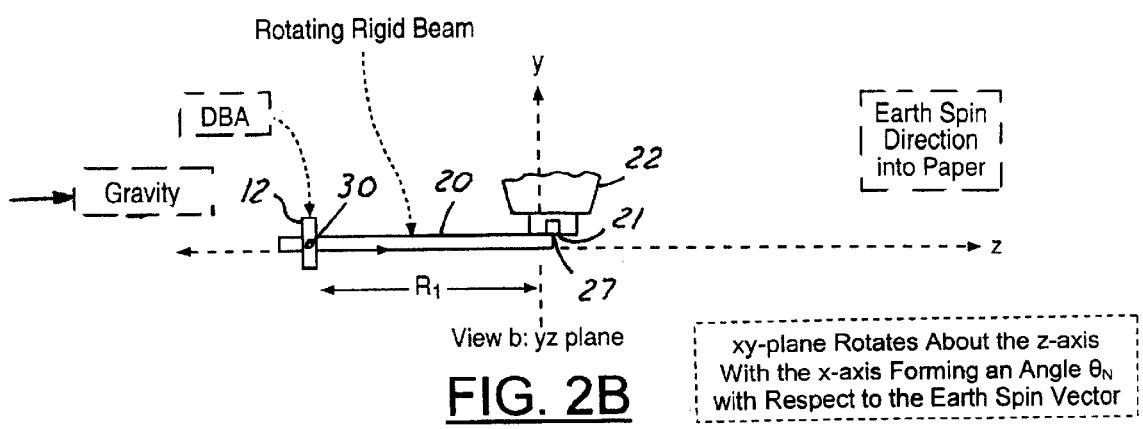
FIG. 2B illustrates an yz-plane view of the compass system of FIG. 2A.

Referring to FIGS. 2A and 2B, a simplified implementation pictorial diagram of the FPCC 11 is illustrated. The present invention includes the compass system 11 mounted on the platform 22, and the signal derivations and the general control mechanism for detecting planar orientation with respect to the earth. The compass system 11 is illustrated in an xz-plane view in FIG. 2A, and an yz-plane view in FIG. 2B.

Figure 3:
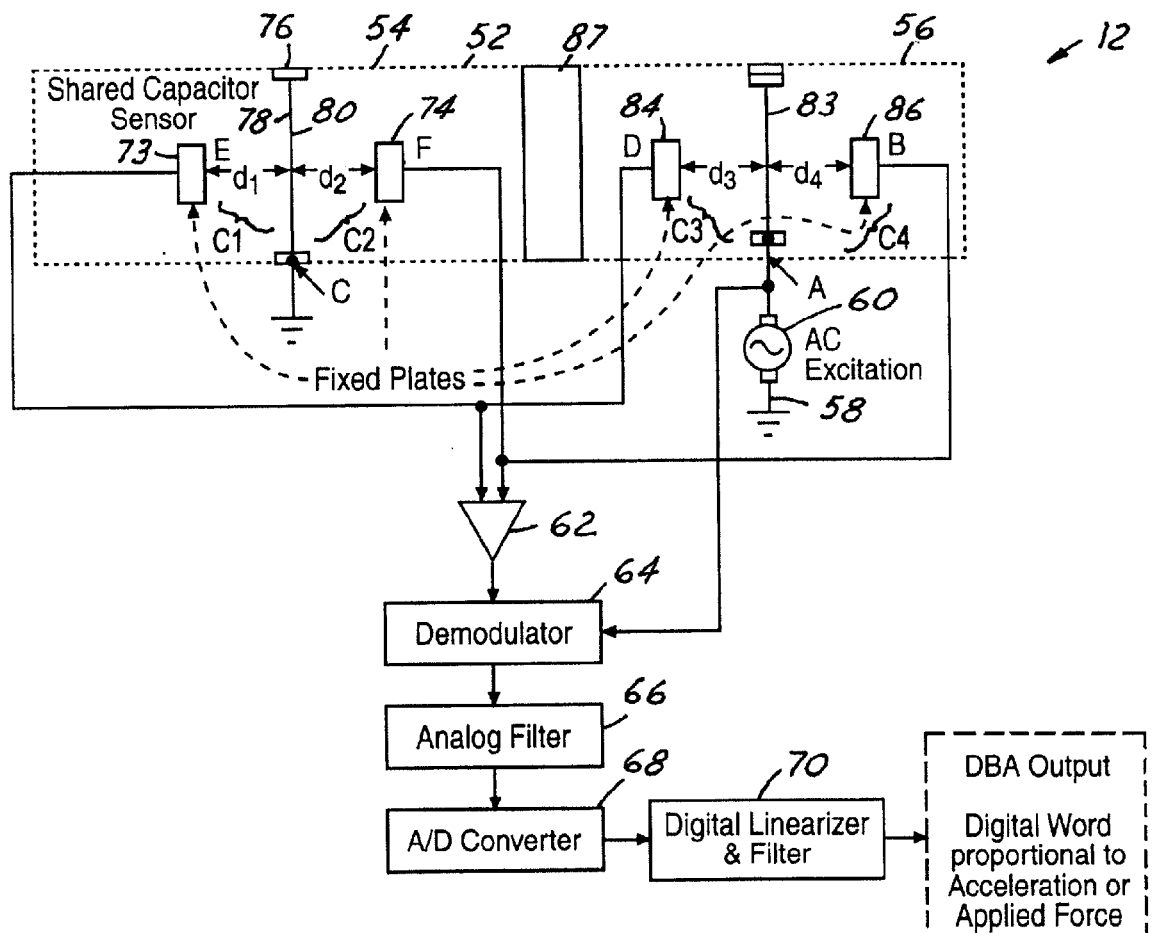
FIG. 3 illustrates a flexure plate dual capacitance accelerometer system in accordance with FIG. 1.

The accelerometer 12 of FIG. 1, configured per FIG. 3 is implemented in the FPCC 11. The FPCC 11 includes a single dual bridge accelerometer 12 (DBA) mounted perpendicular to the axis of a rotating beam 20. The accelerometer 12 includes a flexure plate 30, having a sensitive axis perpendicular to the y-axis.

The rotating beam 20 is mounted on an IMU platform 22, which has been leveled to local earth gravity. The beam 20 is mounted so that it rotates about y-axis, which is in the horizontal xy-plane. The distance from the beam pivot point 27 to the center of the accelerometer flexure plate 30 at rest is R.

The rotation of the beam 20 is in a plane perpendicular to the level platform (xy-plane). The beam is rotating at a constant angular frequency with respect to the IMU y-axis of FIG. 1.

Initially, the rotating beam 20 rotates in either direction at a constant angular frequency. The accelerometer flexure plate 30 reads the sum of the tangential forces at a distance R from the center of rotation. The forces acting on the plate 30 are the result of the sum of the velocity generated by the constant motion of the beam 20 added to the velocity of the earth's rotation and gravity. The radial acceleration of earth rotation is $a_r = V_r^2/r \cos \theta$ where $V_r$ is the earth rate and $\cos \theta$ is the angle between the earth rate vector and the sensitive axis of the accelerometer. The radial acceleration of the rotating beam is $a_r = V_t^2/r$ where $V_t$ is the tangential velocity at the accelerometer a distance r from the rotation center. As the beam 20 rotates, the plate moves through 360 degrees with respect to these parameters. When the earth rate is in the same direction as the rotating accelerometer, the forces add, and 180 degrees from that, they subtract. As the beam 20 rotates about the y-axis and the platform rotates about the z-axis, the $\cos \theta$ varies thereby causing the amplitude to vary from maximum and minimum occurring as the spin radius of earth and beam 20 align. The samples taken by the dial rotation of the beam 20 about the y-axis and the xy-plane rotating about the z-axis are utilized to determine the $\theta=0$ point and therefore the local earth rotation vector. A plot of this acceleration includes a sinusoid riding the constant acceleration generated by the rotating beam 20. By reading the angles of the occurrence of the positive peaks and the negative peaks, the direction of earth rate can be determined. This angular position with respect to the platform 22 is recorded by the processor 14 so that the spin direction, East-West, is precisely determined.

In practice, an angular sensor 21, such as a synchro, resolver or shaft angle encoder reads the position of the rotating beam 20 with respect to the platform 22. This enables the establishment of earth's rotation vector thereby establishing the required compass knowledge and will be used as the basis for guidance equations.

Referring to FIG. 3, an example of a possible configuration for the accelerometer 12 is included as an illustrative example of the accelerometer 12.

The accelerometer 12 is part of the inertial measurement unit 13 and includes a housing 52, a flexured plate section 54, a rigid plate section 56, a ground 58, an AC source 60, a differential amplifier 62, a demodulator 64, an analog filter 66, an analog-to-digital converter 68, and a digital linearizer and filter 70.

The housing 52 or metal housing structure encloses four capacitors, which will be discussed later. A gas or vacuum environment is also enclosed therein such that there is no interference with the movement of the flexure plate 30 other than the rotation of the beam 20 along a perpendicular axis.

The flexured plate section 54 includes a single flexure plate 30 and two parallel fixed plates 73, 74. The rigid plate section 56 includes a rigid plate 83 and two fixed plates 84, 86. The two sections are electrically isolated and enclosed in a metal housing structure 52.

In the present embodiment, the flexure plate 30 is coupled to the housing 52 through at least one edge 76. Numerous other attachment points are, however, included, as will be understood by one skilled in the art. The flexure plate 30 includes a first side 78, a second side 80 and a common edge 76.

The flexure plate 30 is positioned between the first and second fixed plates 73, 74 such that the first fixed plate 73 is a first distance ($d_1$) from the first side 78 and the second fixed plate 74 is a second distance ($d_2$) from the second side 80 of the flexure plate 30. The flexure plate 30 is affixed to the metal housing structure 52 through at least a portion of the common edge 76 of the flexure plate 30, which is also coupled to a ground 58.

The flexure plate is rigidly fixed to the metal housing structure 52 through almost any manner known in the art. Resultantly, all the system flexure is generated within the flexure plate 30. This generally increases reliability and robustness of the system 10. This, however, generates a non-linear output from the flexure plate 30, which will be discussed regarding the linearizer 70.

The combination of the first fixed plate 73 and the flexure plate 30 forms a first parallel plate capacitor, and the combination of the second fixed plate 74 and the flexure plate 30 forms the second parallel plate capacitor.

The capacitance of the parallel plate capacitors is determined by the following:

$$C \cong (\epsilon_0 A)/d,$$

where $\epsilon_0$ is the permittivity constant, A is the area of a fixed plate, and d is the effective distance between the flexure plate 30 and one of the fixed plates 73, 74.

The first fixed plate 73 is coupled to the metal housing structure 52 and positioned a first distance ($d_1$) from the flexure plate 30. The first fixed plate 73 and the flexure plate 30 form a first capacitor (C1) whose operation is also governed by the equation $$C \cong (\epsilon_0 A)/d.$$

The first fixed plate 73 responds to movement of the flexure plate 30 when $d_1$ either increases or decreases, thereby generating a first phase shift capacitance signal.

The second fixed plate 74 is also coupled to the metal housing structure 52 and positioned a second distance ($d_2$) from the flexure plate 30. The second fixed plate 74 and the flexure plate 30 form a second capacitor (C2) whose operation is governed by the equation $$C \cong (\epsilon_0 A)/d.$$

The second fixed plate 74 responds to movement of the flexure plate 30 when $d_2$ either increases or decreases, thereby generating a second phase shift capacitance signal.

The distances ($d_1$ and $d_2$) between the flexure plate 30 and fixed plates 73, 74 are a function of acceleration and are proportional or equal when the system 10 is at rest.

During acceleration, the flexure plate 30 flexes according to the reaction force of Newtow's second law of motion, force=mass×acceleration (F=ma), causing the distance between the flexure plate 30 and the fixed plates 73, 74 to vary, thus creating the two variable capacitors, one on each side of the flexure plate 30.

A rigid plate section 56 is insulated by an insulator 87 from the flexure plate section 54. Third and fourth capacitors (C3 and C4) are formed on either side of the rigid plate 83 in a similar arrangement as the first and second capacitors.

The first and second capacitors are formed on each side of the flexure plate 30 and the third and fourth capacitors are formed on either side of the rigid plate 83. The four capacitors are electrically connected to form a bridge. The fixed capacitors (third and fourth) and rigid plate 83 are isolated from the flexure plate 30 and flexured plate capacitors (first and second). All capacitors are designed to be as nearly equal as possible when at rest.

The distance between the flexure plate 30 and the rigid plate 83 is a function of acceleration. The center of each bridge side is monitored to detect the differential amplitude. As the flexure plate 30 flexes in response to acceleration, one capacitor increases and the other decreases, thereby increasing the bridge voltage on one side and decreasing bridge voltage on the other.

The bridge is excited with an AC source 60 at one end and grounded at the other. The ground 58 is coupled to the flexure plate 30 and the AC source 60 is coupled to the rigid plate 83. The two capacitive legs (C3, C1) and (C4, C2) of the bridge produce two voltage dividers, each of which provides a terminal (ED, FB), to measure the resulting voltage.

The bridge configuration reduces the temperature sensitivity and the AC excitation allowing narrow band analog filtering, both of which enhance the signal-to-noise ratio. The bridge circuitry utilizes GaAs or high speed CMOS, as the accuracy required for performance will require low propagation delays.

The voltage phase gives direct indication of the direction of acceleration. This output is gain adjusted if required in the differential amplifier 62, and received in the demodulator 64, which rectifies the waveform as a function of the reference excitation phase from the AC source 60. The resulting waveform (here a precision sine waveform) is then filtered in the analog domain in the analog filter 66 and received in an analog-to-digital converter 68 where the data becomes a digital word.

The digital word is then filtered and linearized in the digital linearizer and filter 70 for manufacturing and flexure non-uniformities. The filter is embodied, for example, as a multi-pole filter reducing noise to the required time domain level. The filter output is a digital word having a magnitude proportional to the acceleration of the system in either direction along the perpendicular axis. The output of the linearizer 70 is an acceleration signal multiplied by a constant (k).

Statistical filtering of the linearized data somewhere significantly above the maximum flexure frequency also occurs in either the digital linearizer and filter 70 or the computer 14 to reduce the overall noise impact on the system 10. The compensation for the non-linearity of the flexure structure and overall transport error is compensated for by the linearizer and filter 70 whose values are established in manufacturing through sampling performance curves.

The processor 14 is embodied as a typical missile or airplane processor, as is familiar in the art. The processor 14 receives the output signals ($F_1$ from accelerometer 12) and applies the compensation and calibration corrections derived from manufacturing and the earth rate calibration scheme, as will be discussed regarding FIG. 4. The processor 14 monitors the system 10 so that all conditions are met, and the processor 14 also issues an East-West acquisition signal, for launch time or utilization time, and this position is locked as the reference plane.

Coupled to the processor 14 are the missile steering nozzle (or vane actuators) unit 16, the compass system 11, and the platform 22, which includes a rotation reading device 21, such as a synchro, a resolver, or a shaft angle reader.

The rotation reading device 21 reads a position of the rotating beam 20 and generates an angular reference output signal therefrom, which the processor 14 uses to establish true north or any specific compass heading based on the established East-West alignment.

The actuator, here embodied as missile steering nozzle or vane actuators 16 receives processor signals and activates system components (e.g. object control devices) in response thereto. System components include for example, thrusters or attitude control devices.

Figure 4:
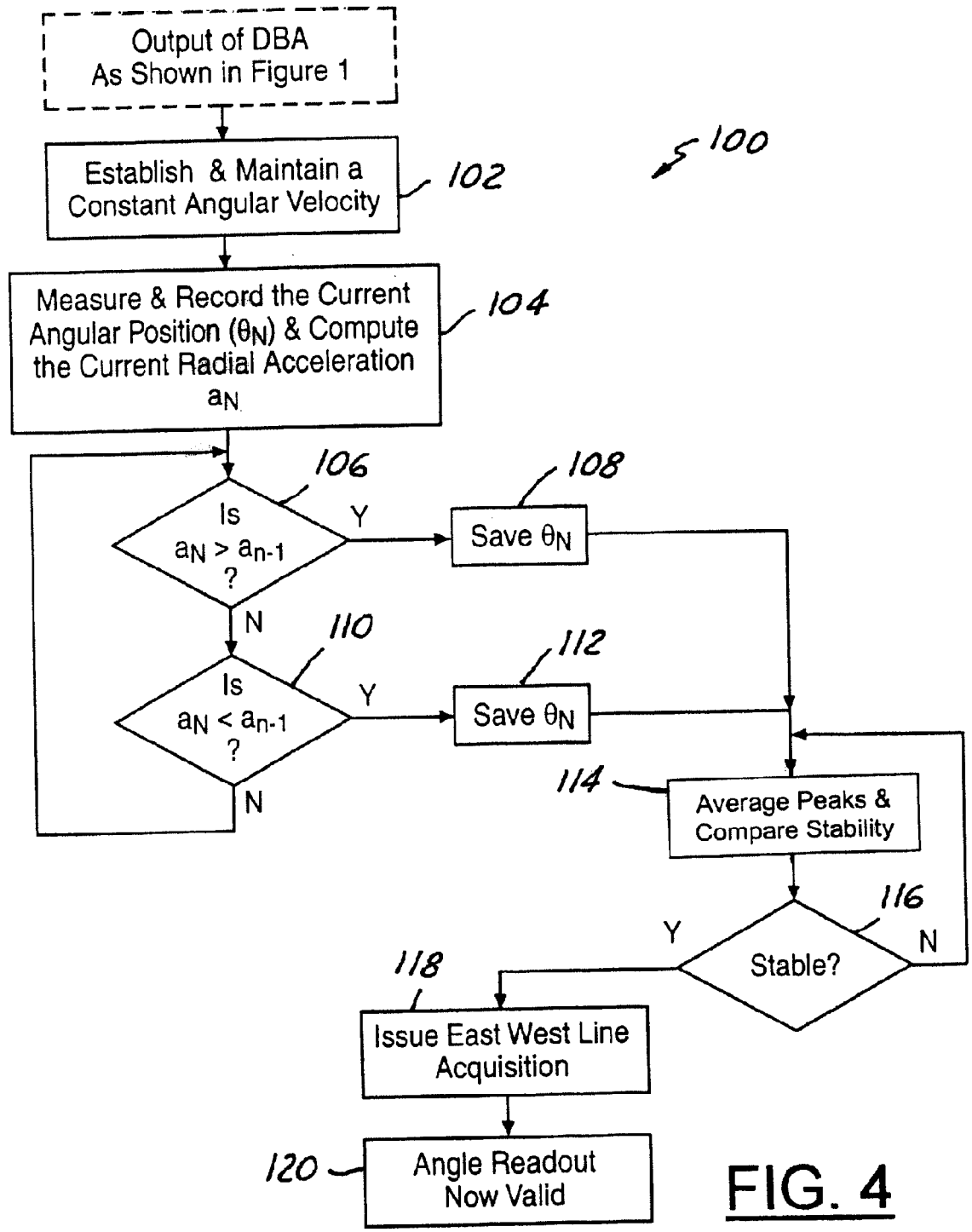
FIG. 4 illustrates a logic flow diagram of the aeronautical system of FIG. 1 in operation, in accordance with another embodiment of the present invention.

Referring to FIG. 4, a logic flow diagram 100 illustrating a method for operating a flexure plate capacitive compass system 11 or an earth rate calibration scheme, in accordance with one embodiment of the present invention, is illustrated. Logic starts in operation block 102 where processor 14 receives the dual bridge accelerometer signal (accelerometer signal) from FIG. 3 and establishes and maintains a constant angular velocity for the rotation of the compass system 11.

In operation block 104, the processor 14 receives signals from the angular position measuring device 21 and records the current angular position ($\theta_N$) of the beam 20 and computes the current radial acceleration of the beam 20 ($a_N$). The radial acceleration of the beam 20 is computed through, for example, $V_r^2/r$ for each acceleration component.

In inquiry block 106, a check is made whether the current radial acceleration is greater than the previous radial acceleration ($a_{n-1}$). For a positive response, in operation block 108, the current angular position is saved.

Otherwise, in inquiry block 110, a check is made whether the current radial acceleration is less than the previous radial acceleration ($a_{n-1}$). For a positive response, in operation block 112, the current angular position is saved. Otherwise, inquiry block 106 reactivates.

In response to the saved current angular position from blocks 108 or 112, operation block 114 activates, and previous and current angular position measurements are compared.

In inquiry block 116, a check is made whether the system 10 is stable, i.e. whether variations in angular position from operation block 114 are beneath a preset threshold. For a negative response, operation block 114 reactivates.

Otherwise, in operation block 118, the East-West line acquisition signal is generated indicating that the compass is now reading the East-West line.

In operation block 120, a signal is generated indicating that the angle readout is valid and may be used directly for compass measurements.

In operation, a method for operating a compass system on the earth includes leveling a platform with respect to local earth gravity; rotating a flexure plate bridge accelerometer perpendicular to the platform and rotating the platform such that the flexure plate bridge accelerometer reads a sum of a velocity of the accelerometer and a rotation of the earth; generating a sinusoidal signal of a rotating acceleration of the flexure plate bridge accelerometer due to the sum of the velocity of the accelerometer and the rotation of the earth; reading a positive peak and a negative peak within the sinusoidal signal; and generating an earth rate direction signal in response to the positive peak and the negative peak.

This process is performed when the missile is at rest, prior to launch. A calibration procedure will allow compensation for the offset introduced by the rotation of the earth.

This process is typically engaged when the missile is at rest, prior to launch, or in flight.

From the foregoing, it can be seen that there has been brought to the art a new and improved compass system. It is to be understood that the preceding description of the preferred embodiment is merely illustrative of some of the many specific embodiments that represent applications of the principles of the present invention. For example, a vehicle, such as an airplane, spacecraft, or automobile could include the present invention for directional control or orientation analysis. Numerous and other arrangements would be evident to those skilled in the art without departing from the scope of the invention as defined by the following claims.

What is claimed is:

1. A compass system comprising:
   a platform defining an x-axis, a y-axis and an xy-plane, wherein a z-axis is orthogonal to said xy-plane;
   a beam rotatably coupled to said platform such that said beam rotates about said y-axis;
   an accelerometer comprising a flexure plate perpendicular to said y-axis, said accelerometer coupled to said beam a distance from said y-axis, said accelerometer generating an accelerometer signal in response to movement of said flexure plate;
   an angular position sensor sensing angular position of said beam relative to said x-axis and said y-axis within said xy-plane, said angular position sensor generating an angular position signal therefrom; and
   a processor receiving said accelerometer signal and said angular position signal, said processor generating an East-West signal therefrom.

2. The system of claim 1, wherein said beam rotates at a constant velocity or a variable velocity.

3. The system of claim 1, wherein said angular position sensor comprises a synchro, a resolver, or a shaft angle reader reading a position of said platform and generating an angular reference output signal therefrom.

4. The system of claim 1, wherein said processor levels said platform with respect to local earth gravity.

5. The system of claim 1, wherein said processor rotates said beam such that said accelerometer reads a sum of a velocity of said accelerometer and a rotation of the earth.

6. The system of claim 5, wherein said processor generates a sinusoidal signal of a rotating acceleration of said accelerometer due to said sum of said velocity of said accelerometer and said rotation of the earth.

7. The system of claim 6, wherein said processor reads a positive peak and a negative peak within said sinusoidal signal.

8. The system of claim 7, wherein said processor generates an earth rate direction signal in response to said positive peak and said negative peak, and wherein said East-West signal is generated from said earth rate direction signal.

9. The system of claim 1 further comprising an actuator activating a system component in response to said platform control signal, wherein said system component comprises a thruster or an attitude control device.

10. The system of claim 1, wherein said accelerometer comprises a dual bridge accelerometer or a flexure plate accelerometer.

11. A method for operating a compass system on the earth comprising:
   leveling a platform with respect to local earth gravity;
   rotating a flexure plate bridge accelerometer perpendicular to said platform such that said flexure plate bridge accelerometer reads a sum of a velocity of said accelerometer and a rotation of the earth as said flexure plate bridge accelerometer is rotated about a y-axis and said platform is rotated about a z-axis;
   generating a sinusoidal signal of a rotating acceleration of said flexure plate bridge accelerometer due to said sum of said velocity of said accelerometer and said rotation of the earth;
   reading a positive peak and a negative peak within said sinusoidal signal; and
   generating an earth rate direction signal in response to said positive peak and said negative peak.

12. The method of claim 11 further rotating said flexure plate bridge accelerometer at a constant velocity and at a distance from a pivot coupled to said platform.

13. The method of claim 11, wherein generating an earth rate direction signal further comprises storing a current angular position of said flexure plate bridge accelerometer in response to a current radial acceleration greater than a previous radial acceleration.

14. The method of claim 11, wherein generating an earth rate direction signal further comprises storing a current angular position of said flexure plate bridge accelerometer in response to a current radial acceleration less than a previous radial acceleration.

15. The method of claim 11, wherein generating an earth rate direction signal further comprises determining a stability of the system.

16. The method of claim 11, wherein generating a maximum sinusoidal signal further comprises adding said velocity of said accelerometer and said rotation of the earth when the earth is rotating along a same radial as the compass system and subtracting said velocity of said accelerometer and said rotation of the earth when the earth is rotating in an opposite direction as the compass system.

17. A compass system for a missile system comprising:
- a inertial measurement unit;
- a platform coupled to said inertial measurement unit defining an x-axis, a y-axis and an xy-plane, wherein a z-axis is orthogonal to said xy-plane;
- a beam rotatably coupled to said platform such that said beam rotates about said y-axis while said platform rotates about said z-axis;
- an accelerometer comprising a flexure plate perpendicular to said y-axis, said accelerometer coupled to said beam a distance from said y-axis, said accelerometer generating an accelerometer signal in response to movement of said flexure plate;
- an angular position sensor sensing angular position of said beam relative to said x-axis and said y-axis of said xy-plane, said angular position sensor generating an angular position signal therefrom; and
- a processor receiving said accelerometer signal and said angular position signal, said processor leveling said platform with respect to local earth gravity, said processor further rotating said beam such that said accelerometer reads a sum of a velocity of said accelerometer and a rotation of the earth, said processor generating a sinusoidal signal of a rotating acceleration of said accelerometer due to said sum of said velocity of said accelerometer and said rotation of the earth, said processor reading a positive peak and a negative peak within said sinusoidal signal, and said processor generating an earth rate direction signal in response to said positive peak and said negative peak, said processor generating an East-West signal in response to said earth rate direction signal.

18. The system of claim 17, wherein said angular position sensor comprises a synchro, a resolver, or a shaft angle reader reading a position of said platform and generating an angular reference output signal therefrom.

19. The system of claim 17, further comprising an actuator receiving processor signals and activating missile or vehicle control devices to rotate said platform in response thereto.

20. The system of claim 17, wherein said processor generates an angle readout valid signal in response to said East-West signal thereby initializing the compass system and signaling that the compass system is reading direction with a substantial degree of accuracy.

* * * * *